June 23, 1970  G. PUSCH  3,516,722

OPTICAL DEFLECTION DEVICE

Filed March 21, 1968  2 Sheets-Sheet 1

3,516,722
OPTICAL DEFLECTION DEVICE
Gunter Pusch, Eberbach (Neckar), Germany, assignor to Electro GmbH & Co.
Filed Mar. 21, 1968, Ser. No. 714,855
Claims priority, application Germany, Mar. 3, 1967, E 33,644
Int. Cl. G02b *17/00*
U.S. Cl. 350—7                                            1 Claim

ABSTRACT OF THE DISCLOSURE

An optical deflection device, for deflecting a light beam in the scanning of an image and transmitting the resultant impulses to a utilization device, has a pair of refractive elements, such as mirrors, which are rotated in opposite directions, yet at equal speeds, to amplify the deflection movement of the light beam.

BRIEF SUMMARY OF THE INVENTION

This invention relates to a device for sinusoidal deflection of light beams. Such devices are used for the linear scanning of an optical image with a series of photoelectric cells and for transmitting the resultant impulse currents to a suitable utilization device.

Optical deflection devices heretofore known operate with mirrors or prisms which are rotated alternately clockwise and counterclockwise. Although the moving parts of such devices are light in weight, they limit the scanning speed because they must be accelerated and retarded in their movement in each direction.

It is an object of the invention to provide a device for deflecting light beams wherein oscillating movement of the parts is replaced by a uniform rotary movement in the same direction.

In accordance with the invention, the device comprises two rotating elements which rotate in opposite directions yet at equal speed, whereby the accelerations and decelerations occurring in oscillatory movements are eliminated, with resultant increase of the speed of the deflection movement of the light beam.

The rotating elements may take various forms, such for example, as prisms rotating in opposite directions. Advantageously, two mirrors may be used, which at all times are inclined one quarter of the total of the angle of inclination with relation to their axes of rotation, and for this purpose the axes of rotation of the mirrors are arranged parallel to each other.

In order to maintain the size of the rotating elements within desirable limits the mirrors are advantageously arranged in the converging path of the rays.

The two mirrors must be interconnected in such manner as to produce synchronous and phase rotation. In such case the circular deflections of a beam of light produced in each mirror are mutually cancelled, so that the scanning movement of a ray is a back and forth movement along a straight line.

The coupling of the two mirrors for rotary movement may be carried out by mechanical means, making certain that the parts are very carefully selected, because they are subjected to extreme wear. It is accordingly contemplated to provide an individual drive for each mirror, with provision for adjustment of the drive motors to insure synchronous movement of the mirrors in correct phase relation. Such adjustment may be effected in a simple manner by providing a shutter on the periphery of each mirror so as to allow, during each turn, passage of a light ray which emits an impulse through a photoelectric cell for producing the necessary adjustment.

Alternatively, a magnet may be provided on the axis of rotation of each mirror, the two magnets being arranged in such a manner that their cooperation controls the adjustment of at least one of the drive motors.

A furher alternative arrangement consists in providing on each drive shaft a dynamo whose phases and frequencies may be continuously compared and utilized for adjustment in case of deviations. In this alternative arrangement, the indicated alternating current voltage may be utilized for deflection of a suitable utilization device. Also, the impulse received from the phase and frequency comparison of the two dynamos may be utilized for synchronizing an oscillator of the utilization device.

When the mirrors are correctly inclined at the above indicated angle with relation to their axes of rotation, there is obtained as a deflection line of the ray a straight line, which is traversed or swept once during the forward movement and again during the return movement. Each line is accordingly scanned twice during each rotation of the mirror. A scanning speed almost twice as great may be obtained by increasing the angle of one of the mirrors by about $\Delta_a$. In that case a rotation will produce an ellipse or loop which, with a suitable selection of the angle $\Delta_a$, will contain two scanning lines. For limiting the lengths of the scanning along the straight lines of an ellipse, it is contemplated, in accordance with a further feature of the invention, that the angle of inclination of the two mirrors will be such that the sine wave produced by the mirrors is substantially 10 to 20% greater than the width of the image.

An embodiment of the invention is illustrated in the accompanying drawings, in which.

Figure 1:
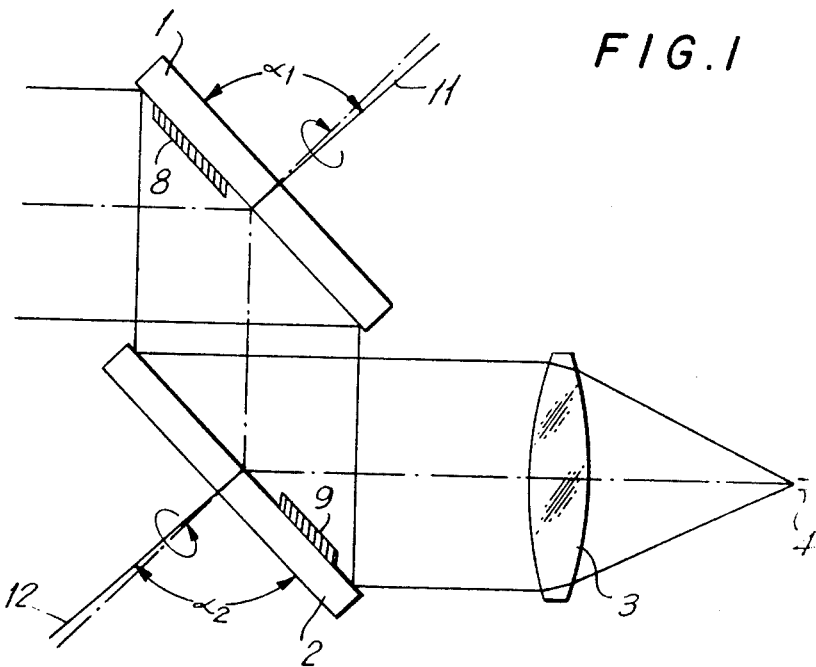
FIG. 1 illustrates the device according to the invention with the mirrors disposed in front of the convergent portion of the optical apparatus.

Referring to the drawings, in which the two mirrors are designated by the reference numerals 1 and 2, mirror 1 rotates in one direction about an axis 11, while mirror 2 rotates in the opposite direction about an axis 12. The two mirrors rotate at the same speed. The mirror 1 forms an angle $\alpha_1$, with its axis of rotation 11, while mirror 2 forms an angle $\alpha_2$ with its axis of rotation 12. Both angles are somewhat greater than 90°. The mirrors are provided with shutters 8 and 9 so as to reflect pulsed light.

Connected to the optical apparatus is a collector lens 3, which transmits the incoming rays to a receiver or utilization device 4.

Figure 2:
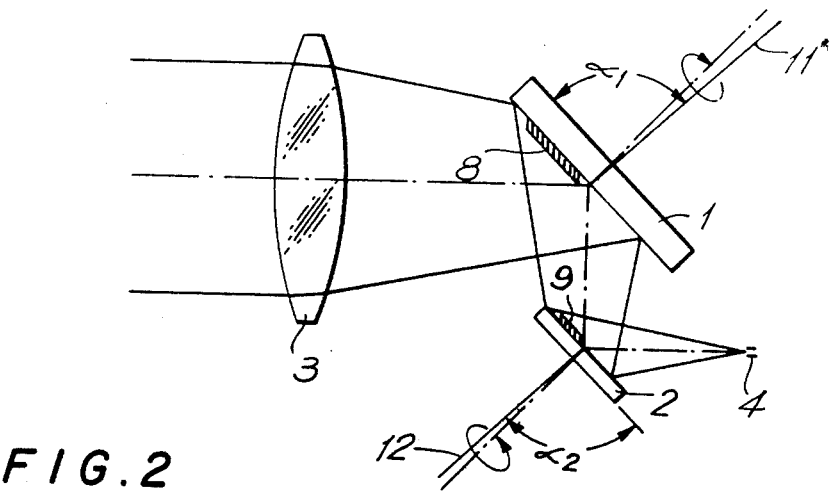
FIG. 2 is a view of the device illustrated in FIG. 1, in which the mirrors are in the convergent portion.

In FIG. 1 the rotating mirrors are shown arranged in front of the lens 3, whereas in FIG. 2 they are shown behind the lens, that is to say within the converging path of the beam. This arrangement permits use of smaller mirrors, which is advantageous from the standpoint of the drive and of the entire assembly.

Figure 4:
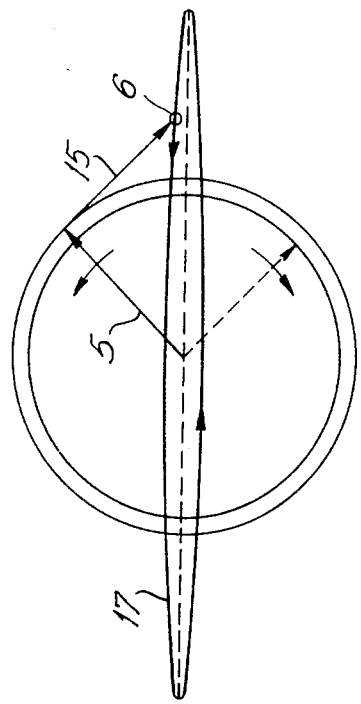
FIG. 4 represents a vector diagram wherein the angles of inclination of the mirrors relative to their axes of rotation diverge slightly from each other.
Figure 3:
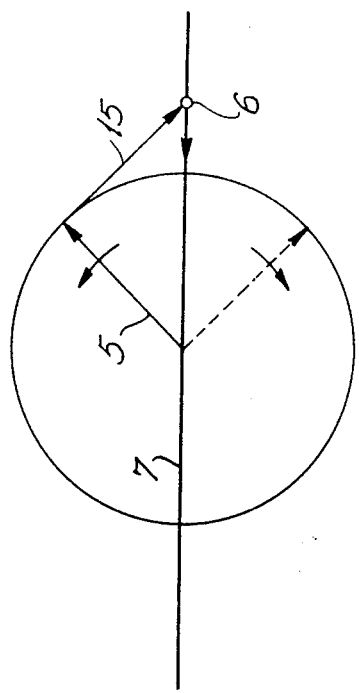
FIG. 3 represents a vector diagram, with the two mirrors disposed at the same angle to their axes of ration.

The movements of the light beams over the photoelectric cells of the receiver 4 are represented in the diagrams in FIGS. 3 and 4. In both these diagrams a counterclockwise vector 5 is joined by a clockwise vector 15. The lengths of the vectors thus determine the size of the angle formed by each mirror with its axis of rotation. In FIG. 3, the two vectors turn in equal phase but in opposite directions. The end point 6 of the vector 15 accordingly describes in its back and forth movement a straight line 7. In FIG. 4, one vector leads the other by the angle $\Delta_a$; this is to say, that the quantity of the vectors 5 and 15 is the same in FIG. 3, but different in FIG. 4.

As a result of the vector 5 leading the vector 15, the end point 6 of the vector 15 describes a loop or ellipse instead of the straight line 7. This circumstance may be utilized to cause the oscillating light beam to pass through each line of photoelectric cells only once, while passing at all times through the next line during its return movement.

I claim:

1. Apparatus for the linear scanning of an optical image comprising a row of photocells each of said photocells being allocated to two lines of the image, two planar mirrors for scanning the image and deflecting a beam representative of the same, and means for rotating the mirrors in opposite directions at the same speed, said mirrors having opposed mirror surfaces defining an acute angle with the planes perpendicular to their axes of rotation, the angle of one mirror differing from the angle of the other by an amount such that the line described by the beam on the image surface constitutes a flat ellipse having a minor axis corresponding to the spacing of at least two lines, the axes of rotation of the rotating mirrors being parallel but mutually shifted, the sinusoidal oscillation carried out by the mirrors being about 10 to 20% greater than the image width.

References Cited

UNITED STATES PATENTS

| | | | |
|---|---|---|---|
| 2,758,502 | 8/1956 | Scott et al. | 250—235 X |
| 3,023,662 | 3/1962 | Hicks | 350—7 |
| 3,038,077 | 6/1962 | Gillespie et al. | 250—235 X |
| 3,116,886 | 1/1964 | Kuehne. | |

PAUL R. GILLIAM, Primary Examiner

U.S. Cl. X.R.

178—7.6; 350—6, 285